May 7, 1963
R. COLOMBO
3,088,166
METHOD AND APPARATUS FOR SHEATHING A STRUCTURAL MEMBER
WITH A SYNTHETIC THERMOPLASTIC MATERIAL
Filed Oct. 13, 1959
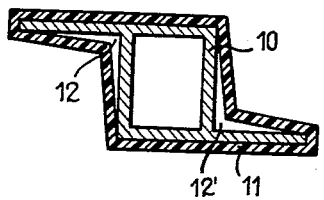
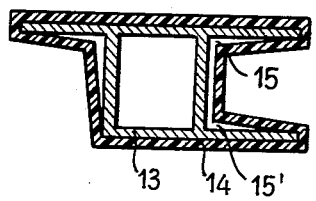
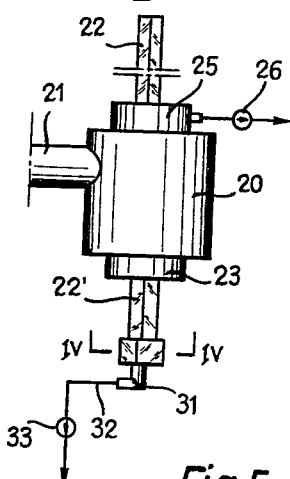
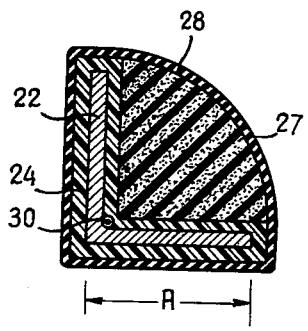
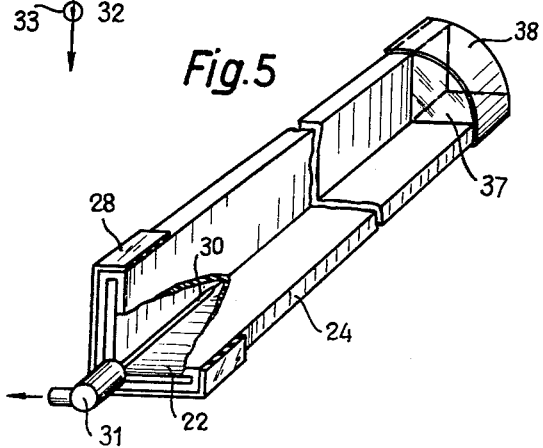

ന3,088,166
METHOD AND APPARATUS FOR SHEATHING A STRUCTURAL MEMBER WITH A SYNTHETIC THERMOPLASTIC MATERIAL
Roberto Colombo, Turin, Italy, assignor to S.A.S. Lavorazione Materie Plastiche (L.M.P.) di M. I. Colombo & C., Turin, Italy
Filed Oct. 13, 1959, Ser. No. 846,202
Claims priority, application Italy Oct. 20, 1958
5 Claims. (Cl. 18—13)

This invention relates to sheathing of mostly metallic structural members with a synthetic thermoplastic material by simultaneously advancing the structural member through an extrusion head for the material and extruding on the said structural member a protective layer of the material, such as polyvinyl chloride, polyethylene and other thermoplastic materials.

Sheathing by the above method of the structural members having a convex outer profile, such as tubes and bars of circular, square, polygonal, etc. cross-sectional shape does not generally meet with particular difficulties and almost always leads to a composite article in which the sheath satisfactorily adheres to the structural member. Only when using linear superpolyamides difficulties were met in assuring adherence, the said difficulties having been obviated by applying vacuum at the inlet of the structural member into the extrusion head, whereby the sheathing material was sucked against the structural member during extrusion.

The use of metallic structural members in the manufacture of frames for doors, windows and glass walls generally, considerably expanded of late, and attempts were made at sheathing the said structural members with protective layers of synthetic plastic material, such as polyvinyl chloride. However, the said structural members have their cross-sectional shape of a concave profile, that is, comprising one concave angle at least, and it was found that at the said concave angle the layer of synthetic plastic material never adhered to the structural member but suffered a distortion such as to considerably alter the original profile of the structural member, as will be better explained hereinafter.

The primary object of this invention is therefore to provide a method and means adapted to cause the sheath of synthetic thermoplastic material to adhere to the structural member even at the concave angles in the latter, independently of the type of thermoplastic material employed for the sheathing.

All the characteristic features and advantages of this invention will be understood from the appended description referring to the accompanying drawing given by way of example only, wherein:

FIGURES 1 and 2 are cross-sectional views of two structural members sheathed with a synthetic thermoplastic material, showing the drawbacks mentioned above;

FIGURE 3 shows diagrammatically the apparatus according to this invention;

FIGURE 4 is a cross-sectional view on line IV—IV of FIGURE 3 on an enlarged scale and FIGURE 5 is a part sectional perspective view of a sheathed structural member as the sheathing is setting.

In FIGURE 1 a metallic structural member 10 of Z-shaped profile is shown, which is sheathed with a layer 11 of thermoplastic material. The sheathing has been made according to conventional abovementioned techniques, by advancing the structural member coaxially through an extrusion head and extruding thereon the synthetic plastic material in a softened condition through an extrusion nozzle similar in cross-sectional shape to that of the structural member. At the inlet for the structural member into the head a device known per se was fitted in order to tightly insulate the portion of the structural member confined in the head and apply thereto a certain degree of vacuum. Nevertheless, as shown by FIGURE 1, the sheathing material 11 became loosened from the structural member 10 at the concave angles 12, 12', thereby altering in a fully uncontrolled manner the original aspect of the cross-section of the structural member. Considering that a structural member of this kind should be associated with other members in a structure of predetermined size, it will be understood that a sheathed structural member of this kind is not usable.

Conditions are still worst in the case shown in FIGURE 2, in which the sheath 14 of synthetic plastic material has drawn appreciably apart from the structural member 13 along the three faces forming together the concave angles 15, 15'.

It should be noted that FIGURES 1 and 2 are merely diagrammatical and of an illustrative character, distortions actually arising in the practice being much more complex and of an extent not to be foreseen or controlled by means heretofore available.

In FIGURE 3, 20 denotes an extrusion head of a structure known per se fed with softened synthetic thermoplastic material from a screw press (not shown) through a connection 21. The head is formed with an axial passage through which a structural member 22 to be sheathed can be advanced in a downward direction. This structural member 22 is of L-shape, as will be seen more clearly in FIGURES 4 and 5, and the extrusion nozzle 23 on the head 20 comprises a die of a similar L-shaped profile in order to deposit on the structural member a sheathing layer 24 which should accurately match the configuration of the cross-section of the structural member 22. Reference 25, FIGURE 3, denotes a sealing device, known per se, fitted to the head 20 at its inlet end for the structural member 22, connected with a source of vacuum generally indicated on the drawing by a pump 26.

According to this invention as soon as the sheathed lower end portion of the structural member 22 issues downwardly from the head 20, the layer of thermoplastic material sheathing this end portion is tightly pressed against the structural member, for instance in the manner shown in FIGURE 4. In this figure a spongy rubber block 27 of quadrant form is forced by its apex against the hollow angle in the profile and secured in these conditions by means of a rubber band 28. In this manner a restricted length of a few centimeters of the sheath 24 is clamped in a fluid-tight manner throughout the contour of the cross-sectional area of the structural member 22, thereby preventing access of outer air between the sheath of the structural member from the fore end of the latter. The extrusion head and the pump 26 are then again operated, the structural member 22 being simultaneously advanced through the head and sheathed with the thermoplastic material. The sheathed length 22' of the structural member issuing from the head is cooled in a manner known per se, such as by means of water jets.

It has been found that the above measures are thoroughly sufficient to cause the sheath to satisfactorily adhere to the structural member, provided the material of the sheath is relatively soft, such as polyethylene, and provided also the thickness of the sheath is small as compared with the width A of the wings of the structural member. However, the requirement in the technical field is mostly for a relatively hard sheathing, mostly of polyvinyl chloride with a considerable proportion of fillers, so that further features of this invention should then be resorted to, as described hereinafter.

Assuming the structural member 22, FIGURE 3, should be sheathed with rigid polyvinyl chloride, the same course is followed as above by first sheathing the fore end of the profile to make it accessible beneath the head 20, whereafter vacuum is applied to this end also. For this purpose a hollow needle 30 (FIG. 5) is axially fitted at the concave angle in the structural member between the latter and the sheath, the needle 30 having a head 31 for connection through a hose 32 with a source of vacuum indicated in FIGURE 3 by a pump 33. This end of the structural member is then clamped by means of the rubber band 28 and the spongy rubber block 27, as previously described with reference to FIGURE 4, care being taken of limiting the clamping region to a length located within the length of the needle, thereby leaving free and unobstructed the free end of the latter. Thus, the length of the needle should be in any case greater than the length of the associated rubber block 27. At this stage the sheathing proper is carried out by operating the head 20 and pumps 26, 33, and simultaneously advancing the structural member 22 through the head. As the sheathed portion 22′ of the structural member issues downwardly from the head 20, it is cooled by means of water jets as mentioned above, whereby the sheath 24 sets and is stabilized starting from the leading (lower) end of the structural member. By this procedure the tail end (which is the upper end on the drawing) of the structural member 22 finally appears beneath the head 20, the said end being sheathed with still softened material 24, but being no longer submitted to vacuum from means 25, 26. The risk now arises that the sheathing 24 may become loosened from the concave angle on the structural member throughout the length over which the sheathing material has not yet set. In order to obviate this risk the sheath 24 is tightly pressed at the tail end of the structural member also against the latter (FIGURE 5) such as by means of a spongy rubber block 37 and a rubber band 38 similarly as described with reference to FIGURE 4. The structural member is then merely subjected to vacuum set up through the needle 30 and is further cooled in these conditions till full setting of the sheath, whereupon the needle 30 is withdrawn and the clamping means 27, 28 and 37, 38 removed.

By cutting a structural member sheathed as above to pieces, it will be seen that the sheathing is uniform and no loosening between the sheath 24 and structural member 22 is visible to the eye, so that the sheathed member is of a desired cross-sectional configuration and size. Only a magnifying glass will disclose the existence between the sheath 24 and structural member 22 of merely capillary passages, which exactly act in propagating vacuum from the needle 30 throughout the length of the structural member to the clamping means 37, 38, thereby holding the sheath 24 sucked against the structural member 22 till setting.

As mentioned above, for carrying out the above process vacuum set up by the means 25 and 26 is broken at the end of the process. In some particular cases this might result in part loosening of the sheath by an extent such as it cannot be subsequently annulled by the mere action of the needle 30 after fitting the clamping means 37, 38 to the tail end of the structural member. According to a modification of the process described above it might be convenient in such cases to stop extrusion and arrest the structural member 22 shortly before its tail end disappears within the head 20. By this procedure the means 25, 26 associated with the tail end of the structural member will be further operative, while the clamping means 37, 38 shall then be fitted to the sheathed portion 22′ of the structural member directly beneath the extrusion nozzle 23, whereby the whole sheathing between the said clamping means 37, 38 and the leading end of the structural member will safely adhere to the structural member 22, the action of vacuum never having ceased. The tail end of the sheathed member can be then trimmed-off.

It will be understood that this invention is not limited to the embodiment shown on the drawing. More particularly, the clamping means 27, 28 and 37, 38 have been illustrated in one of their simplest forms in association with an L-shaped structural member. With more elaborate structural members, such as the one shown in FIGURE 2, two or more spongy rubber blocks of suitable configuration or even other clamping means equivalent to the ones shown, will be employed, which are all referred to in the appended claims by the general term of clamping means. Further modifications are possible without departing from the scope of the appended claims.

What I claim is:

1. In a process of sheathing with synthetic thermoplastic material an elongated structural member having a concave angle in its cross-sectional outer profile by extruding on the member a sheath of the material in a softened condition while advancing the structural member longitudinally through an extrusion orifice, the improvement which comprises, clamping the thermoplastic material radially inwardly in the direction of said angle circumferentially of said member along a narrow, circumferential zone immediately adjacent the leading end of the structural member when it passes out of said orifice to form a fluid-tight seal between the material and said member throughout said zone, advancing the structural member through said orifice to sheath the structural member circumferentially and longitudinally while maintaining said fluid-tight seal in said zone, providing a short passageway through said zone to provide communication through said fluid-tight zone underneath said material along said concave angle, applying a vacuum at the leading end of said member to said passageway while advancing said member through said extrusion orifice to exhaust air longitudinally of said member along said concave angle while clamping the material along said zone, and setting the thermoplastic material while applying said vacuum and maintaining said zone clamped.

2. In a process of sheathing with synthetic thermoplastic material an elongated structural member having a concave angle in its cross-sectional outer profile by extruding on the member a sheath of the material in a softened condition while advancing the structural member longitudinally through an extrusion orifice, the improvement which comprises, clamping the thermoplastic material radially inwardly in the direction of said angle and circumferentially of said member along a narrow circumferential zone immediately adjacent the leading end of the structural member when it passes out of said orifice to form a fluid-tight seal between the material and said member throughout said zone, advancing the structural member through said orifice to sheath the structural member circumferentially and longitudinally while maintaining said fluid-tight seal in said zone, prior to clamping said material along said narrow zone providing a short passageway through said zone to provide communication through said fluid-tight zone underneath said material along said concave angle, applying a vacuum at the leading end of said member to said passageway while advancing said member through said extrusion orifice, to exhaust air longitudinally of said member along said concave angle while clamping the material along said zone, and setting the thermoplastic material while applying said vacuum and advancing said member through said orifice, clamping radially inwardly said material in the direction of said angle and circumferentially of said member along another narrow zone substantially adjacent the trailing end of said structural member to form a fluid-tight seal between the material in said other zone and said member, and continuing to clamp said material at both of said zones while applying said vacuum and setting the material.

3. In a process of sheathing with synthetic thermoplastic material an elongated structural member having a concave angle in its cross-sectional outer profile by extruding on the member a sheath of the material in a softened condition while advancing the structural member longitudinally through an extrusion orifice in an extrusion head to which a vacuum is applied in operation, the improvement which comprises, clamping the thermoplastic material radially inwardly in the direction of said angle and circumferentially of the member along a narrow zone adjacent the leading end of the structural member when it passes out of said orifice to form a fluid-tight seal between the material and said member throughout said zone, advancing the structural member through said orifice to sheath the structural member circumferentially and longitudinally while maintaining said fluid-tight seal in said zone, prior to clamping said material circumferentially along said narrow zone providing a short passageway through said zone to provide communication through said fluid-tight zone underneath said material along said concave angle, applying a supplemental vacuum at the leading end of said member to said passageway while advancing said member through said extrusion orifice to exhaust air longitudinally of said member along said concave angle while clamping the material along said zone, and setting the thermoplastic material while clamping said zone and applying said supplemental vacuum and advancing said member through said orifice.

4. In a process of sheathing with synthetic thermoplastic material an elongated structural member having a concave angle in its cross-sectional outer profile by extruding on the member a sheath of the material in a softened condition while advancing the structural member longitudinally through an extrusion orifice in an extrusion head to which a vacuum is applied in operation, the improvement which comprises, clamping the thermoplastic material radially inwardly in the direction of said angle and circumferentially of said member along a narrow zone at the leading end of the structural member when it passes out of said orifice to form a fluid-tight seal between the material and said member throughout said zone, advancing the structural member through said orifice to sheath the structural member circumferentially and longitudinally while maintaining said fluid-tight seal in said zone, prior to clamping of said material circumferentially along said narrow zone providing a short passageway through said zone to provide communication through said fluid-tight zone underneath said material along said concave angle, applying a supplemental vacuum at the leading end of said member to said passageway while advancing said member through said extrusion orifice to exhaust air longitudinally of said member along said concave angle while clamping the material along said zone, and setting the thermoplastic material while applying said supplemental vacuum and advancing said member through said orifice, clamping the thermoplastic material radially inwardly in the direction of said angle and circumferentially of said member along another narrow zone adjacent the trailing end of said structural member to form a fluid-tight seal between the material in said zone and said member, and continuing to clamp the material at both of said zones while applying said supplemental vacuum and setting the material.

5. In an apparatus for sheathing with synthetic thermoplastic material an elongated structural member having a concave angle in its cross-sectional outer profile by extruding on the member a sheath of the material in a softened condition while advancing the structural member longitudinally through an extrusion orifice, the improvement which comprises, means for clamping the thermoplastic material radially inwardly in the direction of said angle and circumferentially of said member along a narrow circumferential zone at the leading end of the structural member when it passes out of said orifice to form a fluid-tight seal between the material and said member throughout said zone, while advancing the structural member through said orifice to sheath the structural member circumferentially and longitudinally, a needle insertable under said sheath through said zone prior to clamping said material for providing a short passageway through said zone underneath said material along said concave angle, means for applying a vacuum at the leading end of said member to said needle providing said passageway while advancing said member through said extrusion orifice to exhaust air longitudinally of said member along said concave angle while clamping said material at and setting the thermoplastic material, and stretchable band means for contracting radially inwardly in the direction of said angle and circumferentially of said member the material along another zone adjacent the trailing end of said member to form a fluid-tight seal along said other zone to permit application of a vacuum longitudinally of said member with a sheath thereon.

References Cited in the file of this patent

UNITED STATES PATENTS

| | | |
|---|---|---|
| 1,419,090 | Williams | June 6, 1922 |
| 2,145,941 | Maxfield | Feb. 7, 1939 |
| 2,276,004 | Vidal et al. | Mar. 10, 1942 |
| 2,392,707 | Taylor | Jan. 8, 1946 |
| 2,601,243 | Botts et al. | June 24, 1952 |
| 2,736,897 | Parsons | Feb. 28, 1956 |
| 2,956,305 | Raydt et al. | Oct. 18, 1960 |

FOREIGN PATENTS

| | | |
|---|---|---|
| 453,123 | Great Britain | Sept. 1, 1936 |
| 205,145 | Australia | Jan. 4, 1957 |